US012482927B2

(12) United States Patent
Zhao et al.

(10) Patent No.: US 12,482,927 B2
(45) Date of Patent: Nov. 25, 2025

(54) CIRCULARLY POLARIZED ANTENNA STRUCTURES AND WEARABLE DEVICES

(71) Applicant: Anhui Huami Health Technology Co., Ltd., Anhui (CN)

(72) Inventors: Anping Zhao, Anhui (CN); Zhouyou Ren, Anhui (CN)

(73) Assignee: Anhui Huami Health Technology Co., Ltd., Anhui FTZ (CN)

( * ) Notice: Subject to any disclaimer, the term of this patent is extended or adjusted under 35 U.S.C. 154(b) by 203 days.

(21) Appl. No.: 18/162,477

(22) Filed: Jan. 31, 2023

(65) Prior Publication Data

US 2023/0170620 A1 Jun. 1, 2023

Related U.S. Application Data

(63) Continuation of application No. PCT/CN2021/012445, filed on Aug. 13, 2021.

(30) Foreign Application Priority Data

Aug. 18, 2020 (CN) ......................... 202010833927.9
Aug. 18, 2020 (CN) ......................... 202021727353.9

(51) Int. Cl.
*H01Q 1/27* (2006.01)
*H01Q 7/00* (2006.01)

(52) U.S. Cl.
CPC ............... *H01Q 1/273* (2013.01); *H01Q 7/00* (2013.01)

(58) Field of Classification Search
CPC .......... H01Q 1/36; H01Q 1/273; H01Q 5/328; H01Q 7/00; H01Q 9/0435; H01Q 9/0464; G04R 60/00; G04R 60/10; G04R 60/12
See application file for complete search history.

(56) References Cited

U.S. PATENT DOCUMENTS 5,861,848 A 1/1999 Iwasaki
2018/0294571 A1 10/2018 Lindenmeier et al.
(Continued)

FOREIGN PATENT DOCUMENTS

CN 205750327 U 11/2016
CN 108695587 A 10/2018
(Continued)

OTHER PUBLICATIONS

Extended European Search Report for European Application No. 21857580.1 dated Nov. 13, 2023.
(Continued)

*Primary Examiner* — Robert Karacsony
(74) *Attorney, Agent, or Firm* — Young Basile Hanlon & MacFarlane, P.C.

(57) ABSTRACT

Provided are a circularly polarized antenna structure and a wearable device. The circularly polarized antenna structure is applicable to the wearable device and includes: a mainboard; an annular radiator, having an effective perimeter equal to a wavelength corresponding to a central operating frequency of the antenna structure; a feeding terminal electrically connected to the radiator at one end and connected to a feeding module of the mainboard at the other end; and a grounding terminal electrically connected to the radiator at one end and electrically connected to a grounding module of the mainboard through a first capacitor at the other end. With the antenna structure of the present disclosure, a circularly polarized antenna may be implemented in the wearable device.

19 Claims, 7 Drawing Sheets

(56) References Cited

U.S. PATENT DOCUMENTS

| | | | |
|---|---|---|---|
| 2019/0109367 | A1 | 4/2019 | Tseng et al. |
| 2019/0379122 | A1 | 12/2019 | Kenkel et al. |

FOREIGN PATENT DOCUMENTS

| | | | |
|---|---|---|---|
| CN | 111916898 | A | 11/2020 |
| CN | 212783791 | U | 3/2021 |
| GB | 2570905 | A | 8/2019 |

OTHER PUBLICATIONS

Qu Longyue et al: "Integrated GPS Antenna with Circular Polarization for Metal-Rimmed Smartwatch Applications", 2018 IEEE International Symposium on Antennas and Propagation & USNC/URSI National Radio Science Meeting, IEEE, Jul. 8, 2018 (Jul. 8, 2018), pp. 949-950.

International Search Report and English translation for International Application No. PCT/CN2021/112445 dated Sep. 23, 2021.

CIRCULARLY POLARIZED ANTENNA STRUCTURES AND WEARABLE DEVICES

CROSS-REFERENCE TO RELATED APPLICATION(S)

The present application is a continuation of PCT/CN2021/112445, filed Aug. 13, 2021, which claims priority and benefit of Chinese Patent Application Nos. 202021727353.9 and 202010833927.9, both filed Aug. 18, 2020, the entire disclosures of all of which are hereby incorporated by reference.

TECHNICAL FIELD

The present disclosure relates to the field of electronics technologies, and in particular to a circularly polarized antenna structure and a wearable device.

BACKGROUND

Wearable devices are becoming more and more popular among users due to diverse functions thereof. These functions may be implemented by means of built-in antenna structures of the wearable devices.

Taking a satellite positioning antenna as an example, with the development of the wearable devices, a satellite positioning function has become one of the essential functions. Commonly used satellite positioning systems generally include Global Positioning System (GPS), BeiDou Navigation Satellite System (BDS), and Global Navigation Satellite System (GLONASS).

In order to enhance a transmission efficiency from the satellite to the ground, e.g., to enhance a penetration capacity, a coverage area or the like, a transmitting antenna of the satellite to the ground can be circularly polarized. Likewise, in order to enhance a reception capability of a positioning antenna, a receiving antenna of a device may adopt a circularly polarized antenna similar to the transmitting antenna. However, it can be difficult to adopt circularly polarized antennas in the wearable devices due to the limitation of volume or industrial design, and linearly polarized antennas are generally adopted, which lead to poor satellite positioning performance and inaccurate capture of motion trajectories.

SUMMARY

Implementations of the present disclosure provide a circularly polarized antenna structure and a wearable device.

In a first aspect, an implementation of the present disclosure provides a circularly polarized antenna structure, applicable to a wearable device, the antenna structure including a mainboard; an annular radiator, having an effective perimeter equal to a wavelength corresponding to a central operating frequency of the antenna structure; a feeding terminal electrically connected to the radiator at one end and connected to a feeding module of the mainboard at the other end; and a grounding terminal electrically connected to the radiator at one end and electrically connected to a grounding module of the mainboard through a first capacitor at the other end.

In some implementations, a line connected between the feeding terminal and a center point of the radiator is a first connecting line, and a line connected between the grounding terminal and the center point of the radiator is a second connecting line, and a first included angle β is formed from the first connecting line to the second connecting line along a first direction; the first direction is a counterclockwise direction around the radiator; and $$\beta \in \left(0, \frac{\pi}{2}\right) \cup \left(\pi, \frac{3\pi}{2}\right), \text{ or } \beta \in \left(\frac{\pi}{2}, \pi\right) \cup \left(\frac{3\pi}{2}, 2\pi\right).$$

In some implementations, the first included angle β is 10° to 80°.

In some implementations, the radiator has an annular structure in one of shapes including: a circular ring, an elliptical ring, a rectangular ring, a triangular ring, a diamond ring, or a polygonal ring.

In some implementations, the antenna structure includes one of: a satellite positioning antenna, a Bluetooth antenna, a WiFi antenna, or a 4G/5G antenna.

In some implementations, the first capacitor has a capacitance value of 0.2 pF to 1.5 pF.

In some implementations, the first included angle β is 25°, and the capacitance value of the first capacitor is 0.5 pF.

In a second aspect, an implementation of the present disclosure provides a wearable device, including the circularly polarized antenna structure according to any one of implementations in the first aspect.

In some implementations, the wearable device includes a smart watch, the smart watch including: a case in which the mainboard is disposed; and a metal bezel surrounding an edge of an open end of the case and forming the radiator.

In some implementations, the smart watch further includes a screen assembly assembled to the open end of the case through the metal bezel.

In some implementations, the wearable device includes one of: a smart bracelet, a smart watch, smart earphones, or smart glasses.

BRIEF DESCRIPTION OF DRAWINGS

In order to explain detailed description of the present disclosure or technical solutions in the related art more clearly, the drawings to be used in the detailed description or description of the related art will be briefly introduced below. It is apparent that the drawings in the following description illustrate some implementations of the present disclosure. For those ordinary skilled in the art, other drawings may be obtained from these drawings without any creative efforts.

DETAILED DESCRIPTION

Figure 1:
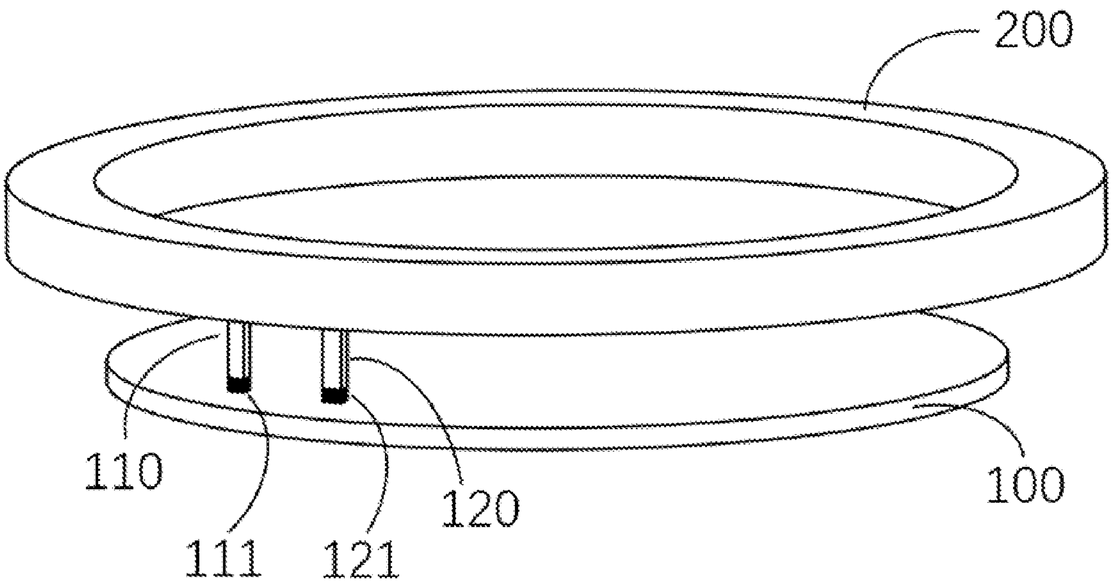
FIG. 1 is a schematic structural diagram of a circularly polarized antenna structure according to some implementations of the present disclosure.

Implementations of the present disclosure will be clearly and completely described below with reference to the accompanying drawings. It is apparent that the described implementations are part of the implementations of the present disclosure, rather than all of the implementations. All other implementations obtained by those ordinary skilled in the art based on the implementations of the present disclosure without any creative efforts shall fall within the protection scope of the present disclosure. In addition, technical features involved in different implementations of the present disclosure described below may be combined with each other as long as they do not conflict with each other.

Circularly polarized antennas are more commonly applied in satellite navigation systems. This is due to the fact that circularly polarized waves generated by the circularly polarized antennas may be received by linearly polarized antennas in any direction, while the circularly polarized antennas may receive incoming waves from the linearly polarized antennas in any direction, resulting in a good antenna performance. Therefore, the circularly polarized antennas are commonly used in satellite positioning, reconnaissance and jamming. The circularly polarized antennas may be divided into left-hand circularly polarized (LHCP) antennas and right-hand circularly polarized (RHCP) antennas. Taking satellite positioning antennas as an example, the major global satellite navigation and positioning systems include GPS, BeiDou, GLONASS, and Galileo, and the satellite positioning antennas in these systems have all adopted the right-hand circularly polarized antennas.

With the development of wearable devices, a satellite positioning function has become one of the essential functions. Taking smart watches as an example, the satellite positioning function may be used in various application scenarios such as motion assistance, trajectory detection, and positioning. However, it can be difficult for the wearable devices to adopt the circularly polarized antennas due to the limitation of volume or industrial design. Most of the satellite positioning antennas in the wearable devices on the market are implemented using the linearly polarized antennas, such as IFAs (Inverted-F Antennas), and slot antennas. However, the linearly polarized antennas have lower efficiency in receiving the circularly polarized waves transmitted from the satellite, which leads to poor positioning accuracy and trajectory detection performance of the wearable devices, making them difficult to meet requirements for high-accuracy positioning.

In order to solve the above problems, some smart watches have started to use the circularly polarized antennas as the satellite positioning antennas. In particular, a circularly polarized antenna performance is generated by feeding an inverted-F antenna (IFA) under a metal ring on an upper surface of the watch, and coupling another parasitic antenna unit (i.e., a grounding branch of the IFA) with the metal ring of the watch. In this circularly polarized design, there are special requirements for lengths of the IFA antenna and the parasitic antenna unit in order to produce a circulating current in the metal ring. That is, the length of the IFA and/or the parasitic antenna unit may be approximately one-quarter arc length of the metal ring so as to achieve an effect of "pulling" the current in the metal ring to produce an effective circulating current. The "effective circulating current" referred to herein means that the produced circulating current may be circulated more uniformly along the metal ring as the phase changes, so as to realize the current of the circularly polarized antenna. In this scheme, because the circulating current in the metal ring is realized by the coupling among the IFA antenna, the parasitic antenna unit, and the metal ring of the watch, there are higher design requirements for coupling gaps among the IFA antenna, the parasitic antenna unit, and the metal ring, which increases the difficulty in antenna design. Furthermore, in this scheme, the IFA antenna and the parasitic antenna unit are FPC (Flexible Printed Circuit) antennas or LDS (Laser Direct Structuring) antennas placed on an antenna bracket, and the antenna bracket undoubtedly occupies the limited space in the watch, which makes application of this scheme for the wearable devices with limited volumes.

In view of the above, implementations of the present disclosure provide a circularly polarized antenna structure with a simple and effective structure, and the antenna structure is applicable to a wearable device, enabling the device to implement an antenna in a circularly polarized form. It may be understood that the wearable device described in the following implementations of the present disclosure may be in any form suitable for implementation, for example, a watch-type device such as a smart watch or a smart bracelet; a glass-type device such as smart glasses, VR glasses, or AR glasses; or a wearable device such as smart clothing or wearing accessories, which is not limited in the present disclosure.

As shown in FIG. 1, in some implementations, the circularly polarized antenna structure in the present disclosure includes a mainboard 100 and an annular radiator 200 (also referred to herein as the radiator 200). The mainboard 100 is a main PCB of the device with processors and corresponding control circuit modules (not shown in the drawings) integrated thereon. The radiator 200 can be an annular metal radiator such as a metal ring, and the radiator 200 is disposed above or outside the mainboard 100, such that a gap is formed between the radiator 200 and the mainboard 100. The radiator 200 is electrically connected to the mainboard 100 through a feeding terminal 110 and a grounding terminal 120, the feeding terminal is connected to a feeding module of the mainboard 100 through a feeding point 111, and the grounding terminal 120 is connected to a grounding module of the mainboard 100 through a first capacitor 121, thereby forming the circularly polarized antenna structure.

The feeding terminal 110 may be connected across the gap formed between the mainboard 100 and the radiator 200. That is, one end of the feeding terminal 110 is electrically connected to the radiator 200, and the other end is connected to the feeding module of the mainboard 100. It may be understood that the feeding terminal 110 and the radiator 200 may be separately formed or may be integrally formed, which is not limited in the present disclosure. In an example, the feeding terminal 110 is integrally formed with the radiator 200, and a free end of the feeding terminal 110 is electrically connected to the feeding module of the mainboard 100 through an elastic member on the mainboard 100, where the feeding terminal 110 is connected to the mainboard 100 to form the feeding point 111.

The grounding terminal 120 may also be connected across the gap formed between the mainboard 100 and the radiator 200; that is, one end of the grounding terminal 120 is electrically connected to the radiator 200, and the other end is connected to the grounding module of the mainboard 100. It may be understood that the grounding terminal 120 and the radiator 200 may be separately formed or may be integrally formed, which is not limited in the present disclosure.

With continued reference to FIG. 1, the grounding terminal 120 is connected to the first capacitor 121, and the radiator 200 is grounded through the first capacitor 121. The first capacitor 121 may be disposed on the mainboard 100. One end of the first capacitor 121 is connected to the other end of the grounding terminal 120, and the other end of the first capacitor 121 is connected to the grounding module of the mainboard 100.

For the circularly polarized antenna structure with the annular radiator, an effective perimeter of the radiator is equal to a wavelength corresponding to a central operating frequency of the antenna structure. Therefore, in case of implementing an antenna structure with a different frequency, it is necessary to set the effective perimeter of the radiator equal to the wavelength corresponding to that different frequency.

It should be noted that, in free space, a physical perimeter around the radiator 200 is the effective perimeter of the radiator 200. However, in an assembled state, assembly structures and materials around the radiator 200 may increase the effective perimeter of the radiator 200; that is, a resonance frequency of the radiator 200 is reduced. For example, when the radiator 200 is assembled with a plastic material (e.g., a plastic bracket or a nano-molded material), the material may increase the effective perimeter of the radiator. Meanwhile, a screen assembly near the radiator 200 such as a glass cover of the screen assembly may have an effect of increasing the effective perimeter of the radiator.

The effective perimeter of the radiator 200 is increased because dielectric constants of both the plastic material and the glass cover are greater than that of air, where the dielectric constant of the plastic and the nano-molded materials is typically 2-3, and the dielectric constant of the glass cover is typically 6-8, and the introduction of materials with high dielectric constants may increase a current intensity in the vicinity of the radiator 200, which in turn increases the effective perimeter of the radiator 200. That is, the actual physical perimeter of the radiator 200 may be reduced in condition of achieving a same resonance frequency by the radiator 200. Therefore, those skilled in the art may understand that the term "effective perimeter" in the implementations of the present disclosure refers to an effective electrical length of the radiator during the actual production of the resonant electric waves, and is not limited to being interpreted as a physical length.

At least one inventive concept of the antenna structure in the present disclosure is to produce a circularly polarized wave by directly feeding the annular radiator 200 and pulling the current generated by the radiator 200 with the grounded first capacitor 121 to form a circulating current being rotated. The principle of production and performance exploration of the circularly polarized wave will be described in detail below, and will not be detailed herein.

As can be seen from the above, implementations of the present disclosure provide a circularly polarized antenna structure, which is applicable to a wearable device. The antenna structure includes a mainboard and an annular radiator, and an effective perimeter of the radiator is equal to a wavelength corresponding to a central operating frequency of the antenna structure. A feeding terminal and a grounding terminal are connected between the mainboard and the radiator. One end of the feeding terminal is electrically connected to the radiator, and the other end of the feeding terminal is connected to a feeding module of the mainboard. One end of the grounding terminal is electrically connected to the radiator, and the other end of the grounding terminal is electrically connected to a grounding module of the mainboard through the first capacitor. The current in the radiator is pulled by the first capacitor, such that the annular radiator produces an effective circulating current being rotated, thereby forming a circularly polarized wave and realizing the circularly polarized antenna structure. Compared with a linearly polarized antenna structure, the circularly polarized antenna structure has higher reception efficiency, resulting in more accurate positioning in implementing a satellite positioning function. By directly feeding the annular radiator without providing other coupling antenna structures, structure and cost of the circularly polarized antenna may be greatly simplified, making it easier to be implemented in wearable devices with small volume and space such as smart watches.

The implementation and principle of the antenna structure in the present disclosure will be described in detail below with reference to a specific implementation shown in FIGS. 1 to 3. In this implementation, the wearable device is a smart watch as an example, and the antenna structure is a satellite positioning antenna of the smart watch as an example.

Figure 2:
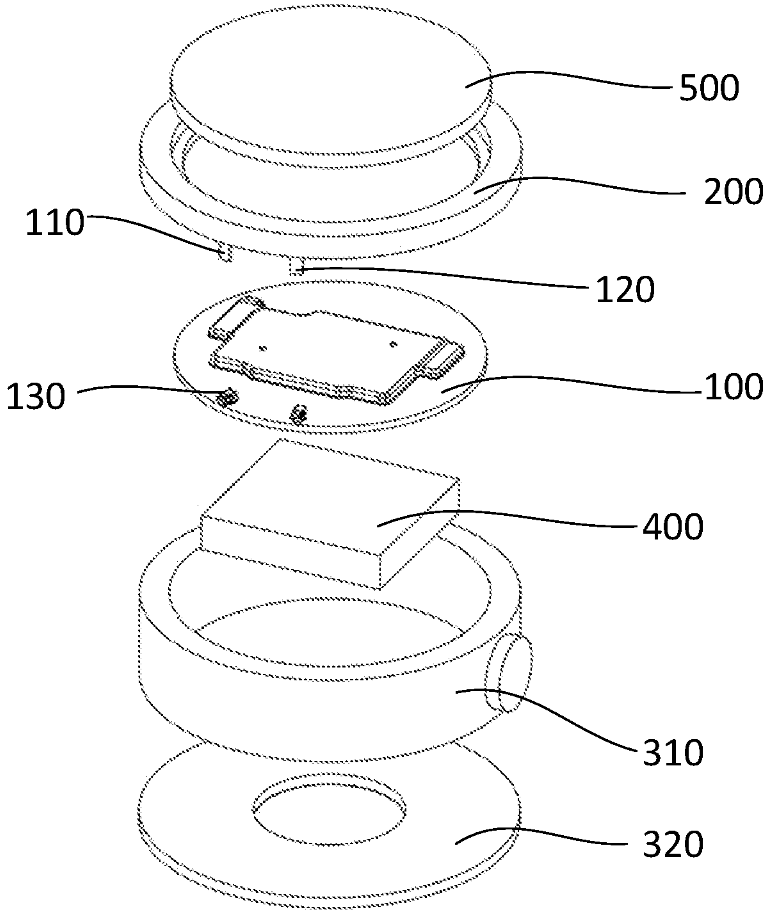
FIG. 2 is an exploded view of a structure of a smart watch according to an implementation of the present disclosure.

As shown in FIG. 2, the smart watch includes a case. The case includes a frame 310 and a bottom case 320, and electrical components such as a battery 400 and a mainboard 100 are accommodated in the case. It should be noted that the frame 310 in this implementation may be a non-metallic frame made of a non-metallic material such as plastic or ceramic, or a metal frame made of a metallic material. The bottom case 320 in this implementation may be made of a non-metallic material such as plastic, or be made of a metallic material, which is not limited in the present disclosure. The case has an open end on an upper side thereof which can be used as a display area of the watch. In this implementation, the radiator 200 of the antenna structure is implemented by a metal bezel of the watch. The metal bezel is provided on the surface of the open end of the case; that is, the metal bezel surrounds an edge of the open end of the case. Due to metallic texture of the metal bezel, the metal bezel may play a good decorative role on the one hand, and may be used to assemble a screen assembly 500 on the other hand. In this implementation, the metal bezel is used as the radiator 200 of the antenna structure, which greatly reduces the occupation of internal space of the watch by the antenna structure, and effectively increases a volume of the radiator, thereby greatly enhancing a radiation performance of the antenna.

Figure 3:
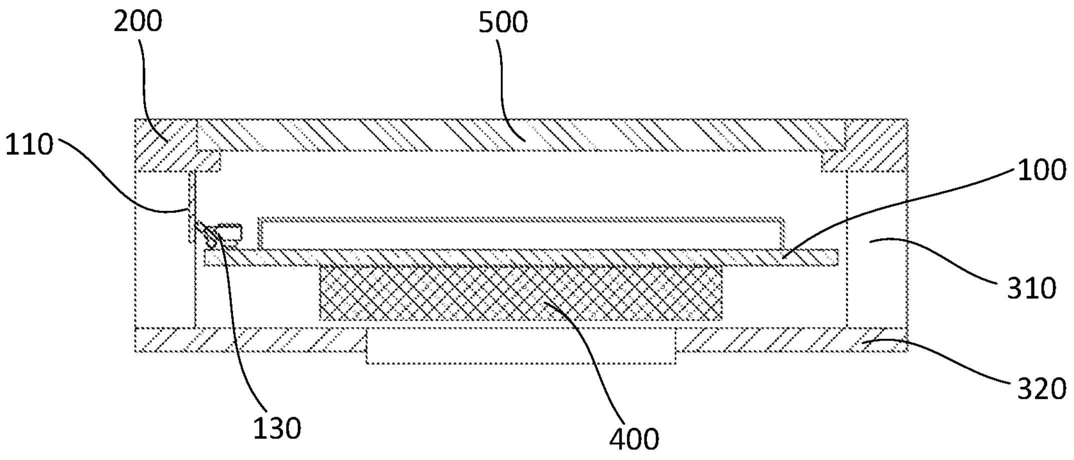
FIG. 3 is a cross-sectional view of a smart watch according to an implementation of the present disclosure.
Figure 4A:
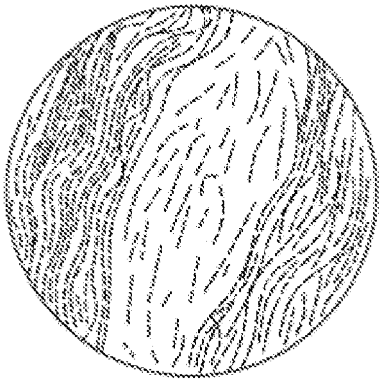
FIGS. 4A to 4D are graphs illustrating changes in current distribution of a circularly polarized antenna structure according to an implementation of the present disclosure.
Figure 4B:
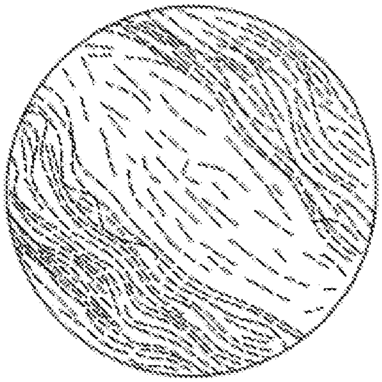
Figure 4C:
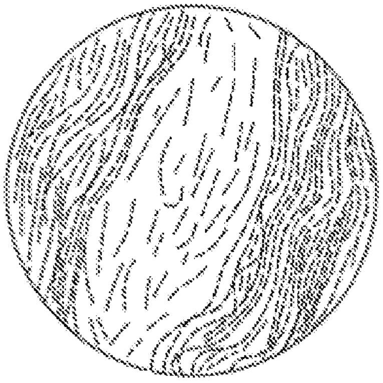
Figure 4D:
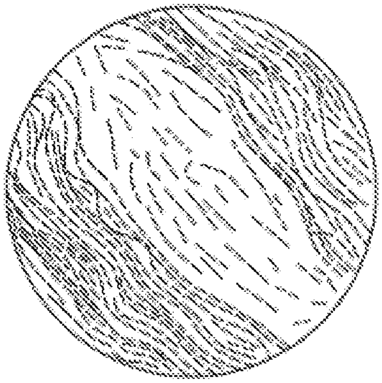

As shown in FIG. 3, in this implementation, the feeding terminal 110 and the grounding terminal 120 are integrally formed with the metal bezel, and are electrically connected to corresponding circuit modules through elastic members 130 such as elastic sheets provided on the mainboard 100 during assembly. The screen assembly 500 is fixedly assembled to the open end of the case through the metal bezel. For the purpose of illustration of the antenna structure, the structure of the watch is simplified and only the structure related to the circularly polarized antenna is shown in FIG. 1.

The implementation of the circularly polarized antenna in this implementation will be described below based on the structure shown in FIG. 1.

First, the circularly polarized antenna may be implemented in two ways. In the first way, the circulating current, which is produced in case of the effective perimeter of the radiator being an integer multiple of the wavelength corresponding to the operating frequency, may form circular polarization. In the second way, two linear currents, which are mutually quadrature and have equal amplitudes and a phase difference of 90°, may form circular polarization. The circularly polarized antenna in this implementation is implemented in the first way. In this implementation, taking a GPS signal with a central operating frequency of 1.575 GHz as an example, a wavelength of the GPS signal may be calculated from the central operating frequency, and the actual physical perimeter of the metal bezel in case of the effective wavelength may be designed based on the influence of the components of the watch such as the case and/or the screen on the wavelength.

For the metal bezel with the effective perimeter equal to one wavelength of the GPS signal, in the implementation of the present disclosure, a rotating current field that rotates in a single direction is formed inside the metal bezel by directly feeding the metal bezel and effectively pulling the generated current using the first capacitor 121.

As shown in FIGS. 4A to 4D, current distribution of the rotating current produced by the metal bezel in a cycle is illustrated. FIGS. 4A to 4D show the current distribution at phases of 0°, 90°, 180°, and 270°, respectively. The denser lines in FIGS. 4A to 4D indicate a higher current density, and the sparser lines indicate a lower current density. By observing the change of positions where the current is zero in FIGS. 4A to 4D, it can be concluded that a circulating current that rotates counterclockwise is produced inside the metal bezel under the effect of the first capacitor 121. If a propagation direction of the circularly polarized wave is +z direction, which is perpendicular to the two-dimensional space occupied by FIGS. 4A to 4D and pointing outward, it can be concluded according to the right-hand screw rule that, the circularly polarized wave produced by the circulating current that rotates counterclockwise is a right-hand circularly polarized wave, thus forming an effective right-hand circularly polarized antenna.

Figure 5:
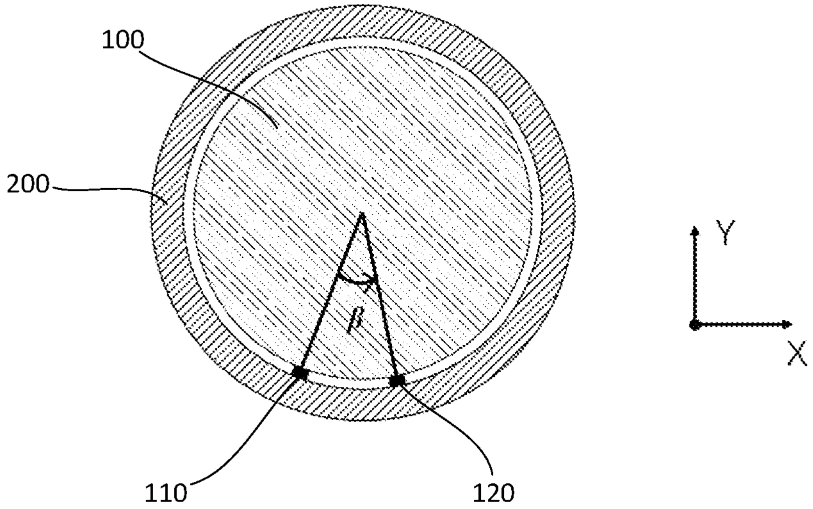
FIG. 5 is a schematic structural diagram of a circularly polarized antenna structure according to an implementation of the present disclosure.

The antenna performance and influencing factors of the circularly polarized antenna in this implementation will be further described below. For illustration purposes, a display screen of the watch is defined as the xy plane, and a direction perpendicular to the display screen of the watch and pointing to the sky is the +z direction, such that a rectangular coordinate system of xyz space may be established. Furthermore, as shown in FIG. 5, a counterclockwise direction around the radiator 200 is defined as a first direction, a line connected between the feeding terminal 110 and a center point of the radiator 200 is a first connecting line, a line connected between the grounding terminal 120 and the center point of the radiator 200 is a second connecting line, and an included angle from the first connecting line to the second connecting line along the first direction (i.e., the counterclockwise direction) is a first included angle β. As an example, the first connecting line may be a line connected between a projection of the feeding terminal 110 in a plane where the radiator 200 is located (e.g., the xy plane in FIG. 5) and a center point of the radiator 200 in the plane, and the second connecting line may be a line connected between a projection of the grounding terminal 120 in the plane and the center point of the radiator 200 in the plane, which is not limited in the present disclosure.

As shown in FIG. 5, since the condition of the annular radiator realizing circular polarization is that the effective perimeter of the radiator is equal to the wavelength corresponding to the operating frequency, it can be seen from the current distribution of the resonant wave that, there may be two zero points and two peaks of the current on the entire circumference, which can also be seen from FIGS. 4A to 4D. Therefore, at a certain moment, the entire circumference may be divided into four regions according to the current distribution, which are:

$$\beta \in \left(0, \frac{\pi}{2}\right),$$

in which the current reaches a peak value at 90° from a zero value at 0°;

$$\beta \in \left(\frac{\pi}{2}, \pi\right),$$

in which the current drops to a zero value 180° from the peak value at 90°;

$$\beta \in \left(\pi, \frac{3\pi}{2}\right),$$

in which the current reaches a peak value at 270° from the zero value at 180°; and $$\beta \in \left(\frac{3\pi}{2}, 2\pi\right),$$

in which the current drops to a zero value at 360° from the peak value at 270°.

The above current distribution is a periodic current change distribution, which may periodically rotate in the annular metal bezel over time under the effect of the first capacitor 121, such that the circularly polarized wave as described above is formed. Moreover, if the current is rotated in a clockwise direction in the metal bezel, a left-hand circularly polarized wave is produced, and if the current is rotated in a counterclockwise direction in the metal bezel, a right-hand circularly polarized wave is produced.

Further, since the current in the metal bezel is rotated under the effect of the first capacitor 121, if the first included angle β satisfies $$\beta \in \left(0, \frac{\pi}{2}\right),$$

the current is "pulled" to rotate counterclockwise; on the other hand, if the first included angle β satisfies $$\beta \in \left(-\frac{\pi}{2}, 0\right),$$

the current is "pulled" to rotate clockwise. This is due to that the phase of the current across the first capacitor 121 is 90° ahead of the phase of the voltage across the first capacitor 121 in an AC circuit. Therefore, when the first included angle β satisfies $$\beta \in \left(0, \frac{\pi}{2}\right),$$

the phase of the current across the first capacitor 121 being 900 ahead may cause the current in the annular radiator 200 to rotate in the counterclockwise direction, thereby realizing a right-hand circularly polarized antenna. Similarly, when the first included angle β satisfies $$\beta \in \left(-\frac{\pi}{2}, 0\right),$$

the phase of the current across the first capacitor 121 being 90° ahead may cause the current in the annular radiator 200 to rotate in the clockwise direction, thereby realizing a left-hand circularly polarized antenna.

Meanwhile, combined with the characteristic that, in the presence of the circularly polarized wave in the annular radiator, the circulating current producing the circularly polarized wave has a periodic distribution on the entire circumference of the annular radiator, it can be known that the circularly polarized antenna satisfies the following rules: if the first included angle β satisfies $$\beta \in \left(0, \frac{\pi}{2}\right) \cup \left(\pi, \frac{3\pi}{2}\right),$$

the current rotates counterclockwise to produce a right-hand circularly polarized wave; while if the first included angle $\beta$ satisfies $\beta \in \left(\frac{\pi}{2}, \pi\right) \cup \left(\frac{3\pi}{2}, 2\pi\right),$ the current rotates clockwise to produce a left-hand circularly polarized wave, where "U" denotes a union of two sets.

At this point, considering that the satellite positioning antennas use the right-hand circularly polarized antennas, the antenna structure, when used as the satellite positioning antenna, may form the right-hand circularly polarized antenna. Therefore, when the antenna structure is used as the satellite positioning antenna, the first included angle β preferably satisfies $$\beta \in \left(0, \frac{\pi}{2}\right) \cup \left(\pi, \frac{3\pi}{2}\right).$$

However, it may be understood by those skilled in the art that in other implementations, the first included angle β may be set to $$\beta \in \left(\frac{\pi}{2}, \pi\right) \cup \left(\frac{3\pi}{2}, 2\pi\right),$$

thereby forming the left-hand circularly polarized antenna.

As can be seen from the above, with the circularly polarized antenna structure according to the implementations of the present disclosure, the line connected between the feeding terminal and the center point of the radiator is the first connecting line, the line connected between the grounding terminal and the center point of the radiator is the second connecting line, and the included angle from the first connecting line to the second connecting line along the counterclockwise direction is the first included angle. By adjusting the first included angle, that is, changing the position of the first capacitor, circularly polarized antennas with different directions may be realized. If the first included angle is in a range from 0° to 90° or in a range from 180° to 270°, the current in the radiator rotates counterclockwise to form the right-hand circularly polarized antenna; and if the first included angle is in a range from 90° to 180° or in a range from 270° to 360°, the current in the radiator rotates clockwise to form the left-hand circularly polarized antenna. With the antenna structure in the present disclosure, circularly polarized waves with different directions may be realized by adjusting the first included angle, which can meet design requirements for the circularly polarized antennas with different directions.

As can be seen from the foregoing, a circularly polarized wave may be decomposed into two linearly polarized waves mutually quadrature with equal amplitudes and a phase difference of 90°. Meanwhile, according to the current distribution of the resonant wave, the current zero point of an electric wave of one order corresponds to the current peak point of an electric wave of another order. Therefore, in order to improve the effect of the first capacitor 121 on the circular polarization, the position of the first capacitor 121 may be as far away as possible from the positions where the current is zero, that is, the positions where the first included angle β is 0°, 90°, 180°, and 270°.

In addition, since the satellite positioning antenna in this implementation considers only right-hand circular polarization, and also considering that there are many other components in the smart watch, such as FPCs for heart rate and the screen, side buttons of the watch, and speakers, the feeding terminal 110 and the grounding terminal 120 may be disposed as close as possible, so as to avoid the influence of the aforementioned components located between the feeding point and the grounding point on the antenna performance. Therefore, in an implementation, the first included angle β is preferably in a range from 10° to 80°.

With the circularly polarized antenna structure according to the implementations of the present disclosure, the first included angle ranges from 0° to 90° to form a right-hand circularly polarized wave. Since a transmitting antenna for satellite positioning uses the right-hand circularly polarized wave, using a right-hand circularly polarized antenna structure for reception can improve the antenna efficiency and positioning accuracy. The first included angle is further preferably in the range from 10° to 80°, such that the position of the first capacitor is far away from the current zero positions (i.e., the positions where the first included angle β is 0°) or the current peak positions (i.e., the positions where the first included angle β is 90°) of two quadrature components of the circularly polarized wave, so as to maintain the independence of the two quadrature components of the wave, thus improving the radiation efficiency of the circularly polarized antenna and improving the antenna performance.

After determining the first included angle β as in the range from 10° to 80° as described above, the antenna structure may be further optimized below.

Axial ratio (AR) is an important parameter to characterize the performance of the circularly polarized antenna. AR refers to a ratio of two quadrature electric field components of the circularly polarized wave. The smaller the AR, the better the circular polarization performance; and on the contrary, the larger the AR, the worse the circular polarization performance. In the application scenario of this implementation, an indicator of the performance of the circularly polarized antenna is that the AR should be less than 3 dB.

On the other hand, since an important characteristic of the circularly polarized antenna in this implementation is to use the first capacitor to pull the current in the metal bezel. The pulling effects achieved by capacitors with different capacitance values are different. Through a large number of comparative experimental studies, the capacitance value of the first capacitor, the first included angle β, and the operating frequency with the axial ratio less than 3 dB satisfy the following relationships:

If the capacitance value of the first capacitor remains fixed, the operating frequency with the axial ratio less than 3 dB decreases as the first included angle β increases. If the first included angle β remains fixed, the operating frequency with the axial ratio less than 3 dB decreases as the capacitance value increases. In addition, when the first included angle β is less than 45°, the operating frequency with the axial ratio less than 3 dB has a smaller trend of change with the capacitance value of the first capacitor; on the contrary, when the first included angle β is greater than 45°, the operating frequency with the axial ratio less than 3 dB has a larger trend of change with the capacitance value of the first capacitor. Moreover, the first capacitor with a relatively large capacitance value may be provided when the first included angle β is less than 45°; on the contrary, the first capacitor with a relatively small capacitance value may be provided when the first included angle β is greater than 45°. The capacitance value (in the unit of pF) of the first capacitor may be in the range from 0.2 pF to 1.5 pF.

Based on the above characteristic, the circularly polarized antenna may be optimized by adjusting the first included angle β and the capacitance value of the first capacitor. The optimization goal is that the operating frequency range of the antenna meets the frequency requirement of the satellite positioning antenna, while the axial ratio in the frequency range is less than 3 dB.

Figure 6:
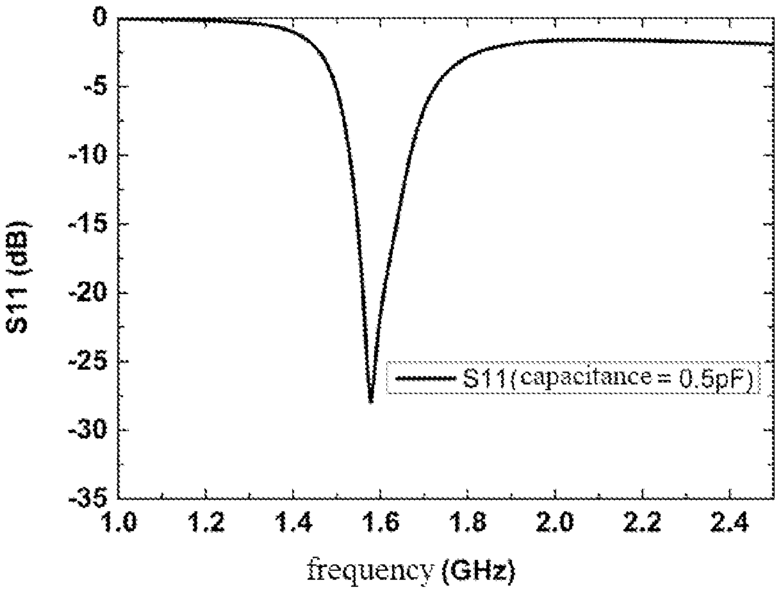
FIG. 6 is a graph illustrating a return loss of a circularly polarized antenna structure according to an implementation of the present disclosure.
Figure 7:
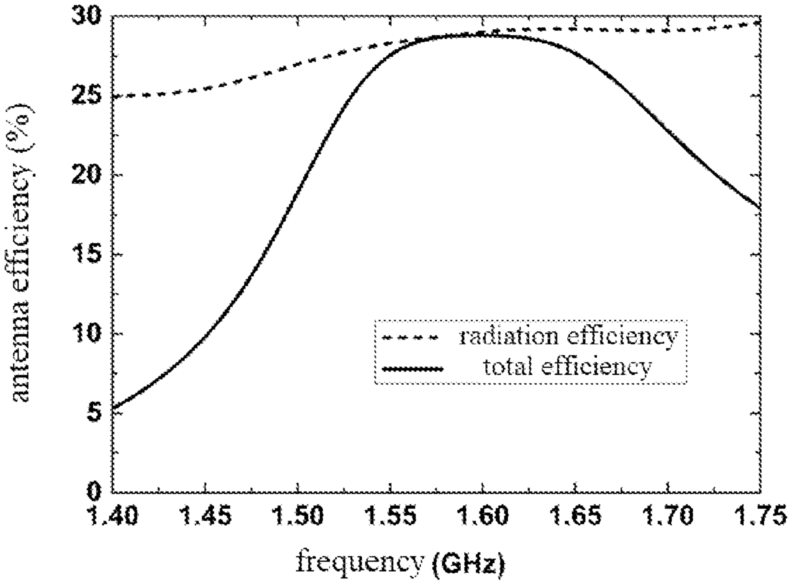
FIG. 7 is a graph illustrating an antenna efficiency of a circularly polarized antenna structure according to an implementation of the present disclosure.
Figure 8:
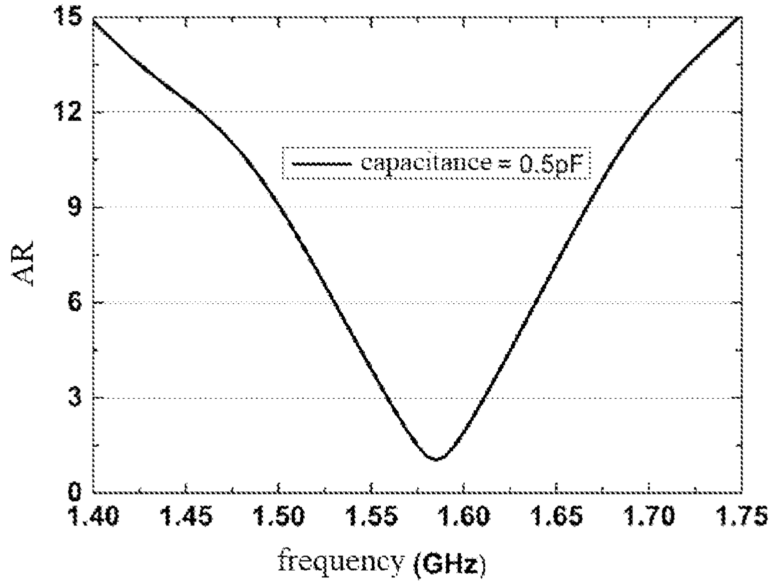
FIG. 8 is a graph illustrating an axial ratio of a circularly polarized antenna structure according to an implementation of the present disclosure.
Figure 9:
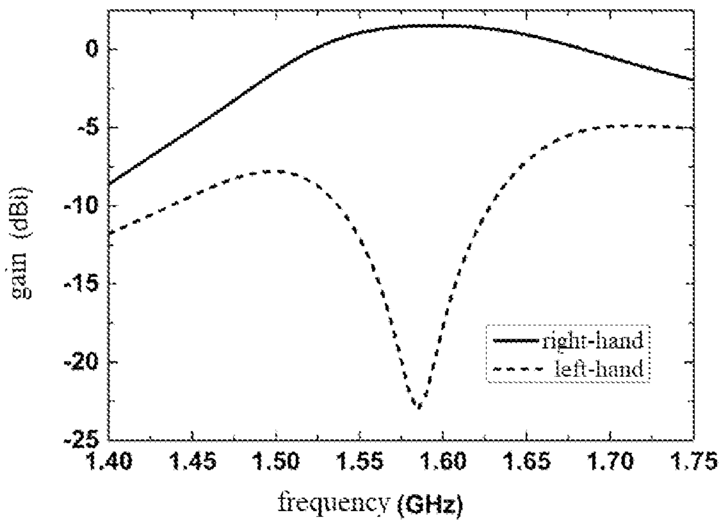
FIG. 9 is a graph illustrating a gain of a circularly polarized antenna structure according to an implementation of the present disclosure.

In an example, the optimization requirement is met in case of the first included angle β being 250 and the capacitance value of the first capacitor being 0.5 pF. In this case, a satellite positioning antenna with right-hand circular polarization and an axial ratio less than 3 dB in the operating frequency range may be realized. FIG. 6 is a graph illustrating a return loss of the antenna under the condition that the watch according to this example is in the state of being worn, and FIG. 7 is a graph illustrating the antenna efficiency under the condition that the watch according to this example is in the state of being worn. As can be seen from FIG. 6 and FIG. 7, the antenna according to this implementation has good return loss and antenna efficiency in the frequency range of satellite positioning, for example, the frequency range of satellite positioning is 1.56-1.61 GHz and the bandwidth is 50 MHz. FIG. 8 illustrates a change of an axial ratio of the antenna with a frequency under the condition that the watch according to this example is in the state of being worn, and FIG. 9 illustrates a change of right-hand and left-hand gains of the antenna with a frequency under the condition that the watch according to this example is in the state of being worn. As can be seen from FIG. 8, the axial ratio of the antenna in this implementation is less than 3 dB in the frequency range of satellite positioning, which can meet the right-hand circular polarization requirements for the satellite positioning antennas such as in GPS, BeiDou, and GLONASS. Meanwhile, for a right-hand circularly polarized antenna with a better performance, the gain of the right-hand polarized wave may be at least 10 dB higher than that of the left-hand polarized wave. As can be seen from FIG. 9, the gain of the right-hand polarized wave is more than 15 dB higher than that of the left-hand polarized wave for the antenna in this example, resulting in a good right-hand circular polarization performance, which further proves that the antenna according to the implementations of the present disclosure has a better antenna performance.

In order to further illustrate the performance of the antenna in this example, a GPS satellite positioning antenna with a central operating frequency of 1.575 GHz is used as an example below to further describe the performance of the antenna.

Figure 10:
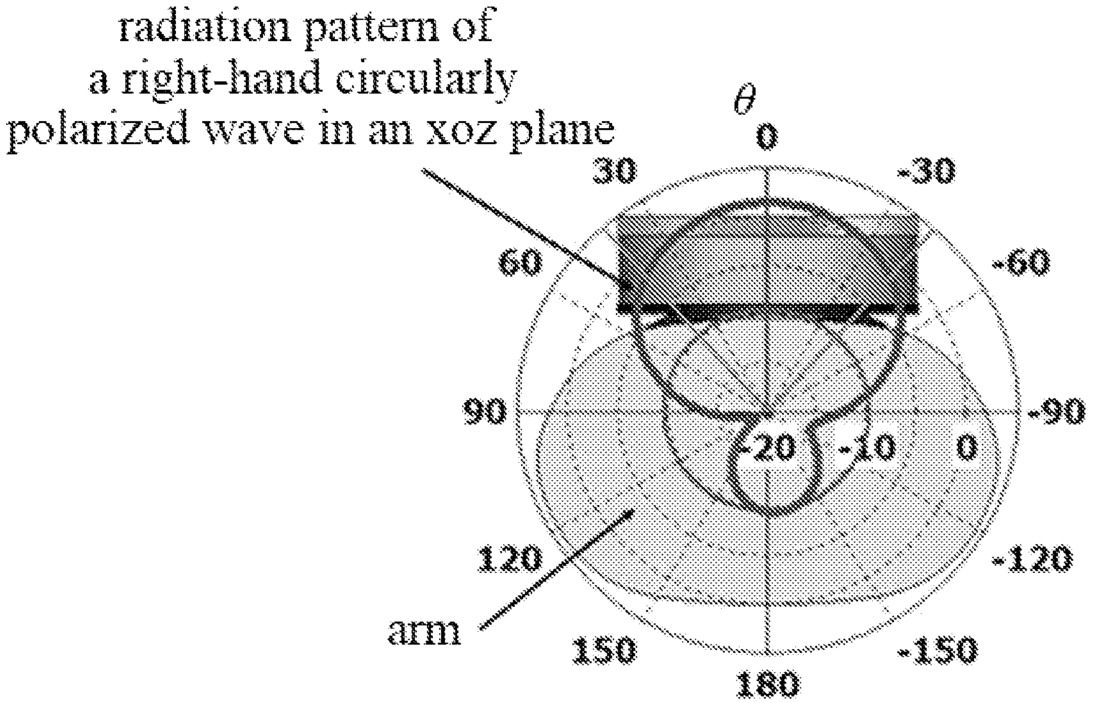
FIG. 10 is a radiation pattern of a circularly polarized antenna structure in an xoz plane according to an implementation of the present disclosure.
Figure 11:
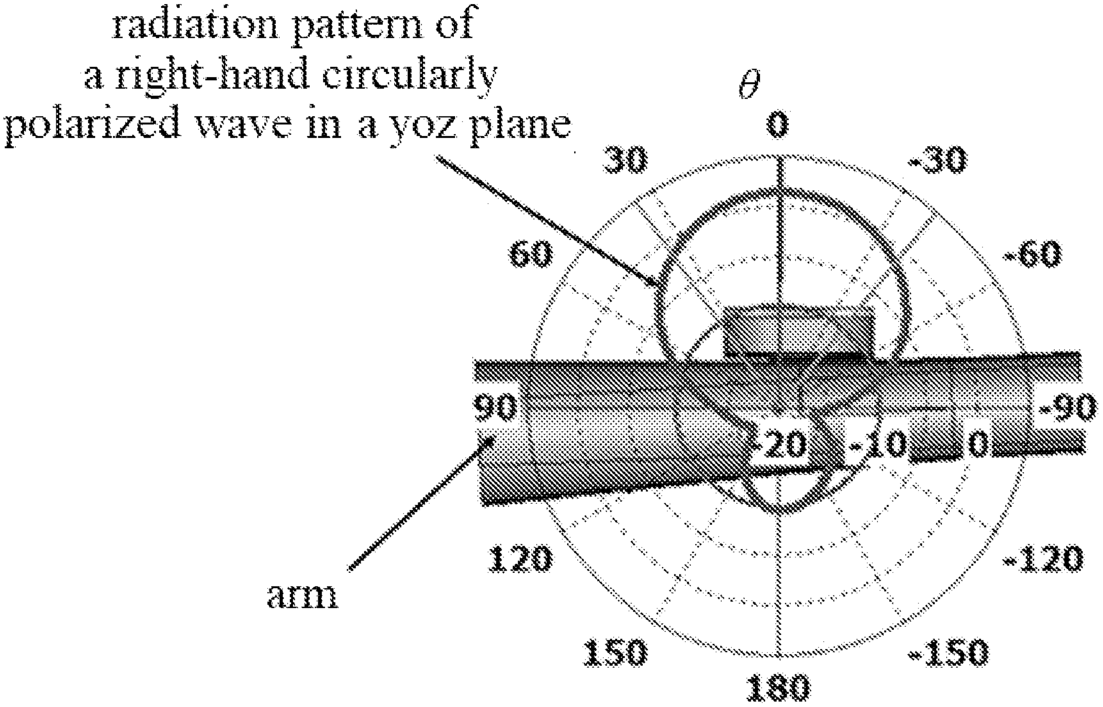
FIG. 11 is a radiation pattern of a circularly polarized antenna structure in a yoz plane according to an implementation of the present disclosure.

FIG. 10 illustrates a radiation pattern of a right-hand circularly polarized wave of the antenna in an xoz plane under the condition that the watch according to this example is in the state of being worn, and FIG. 11 illustrates a radiation pattern of a right-hand circularly polarized wave of the antenna in a yoz plane under the condition that the watch according to this example is in the state of being worn. As can be seen from FIG. 10 and FIG. 11, the maximum gain of the antenna in this example appears at a position above an arm, and can just meet the three main application scenarios of the watch in the state of being worn, which includes: when the wrist is raised to observe the watch, the direction (i.e., +z direction) of the watch pointing to the sky; in the case of running or walking, the 6 o'clock direction pointing to the sky when the arm is swinging; and when the arm is swinging, the 9 o'clock direction pointing to the sky. Therefore, the antenna in this example has good radiation efficiency as the satellite positioning antenna, which greatly improves the antenna performance. Furthermore, it can also be seen from FIG. 10 that the radiation of the antenna has good symmetry in the xoz plane, which shows that the antenna in this example has good consistency for being worn on the left hand and right hand, and can satisfy the needs of users wearing watches on the left hands and users wearing watches on the right hands.

Figure 12:
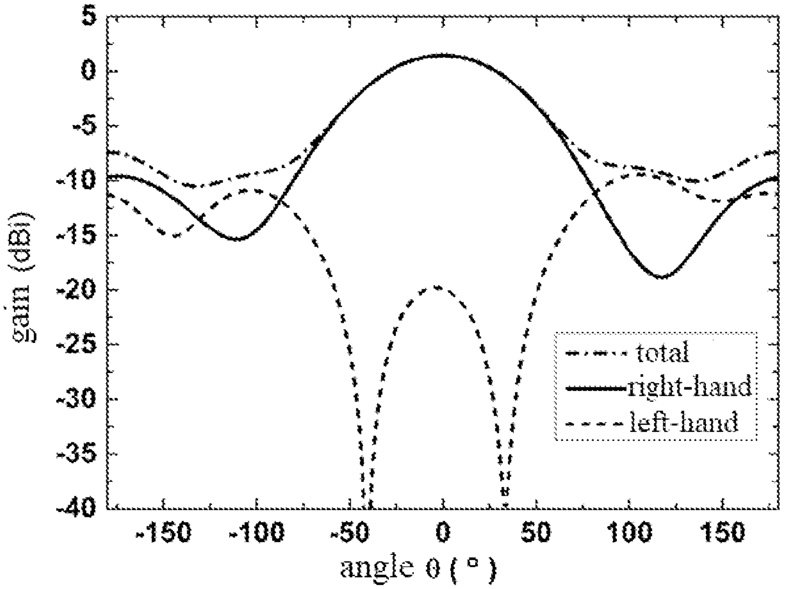
FIG. 12 is a graph illustrating a gain of a circularly polarized antenna structure in an xoz plane according to an implementation of the present disclosure.
Figure 13:
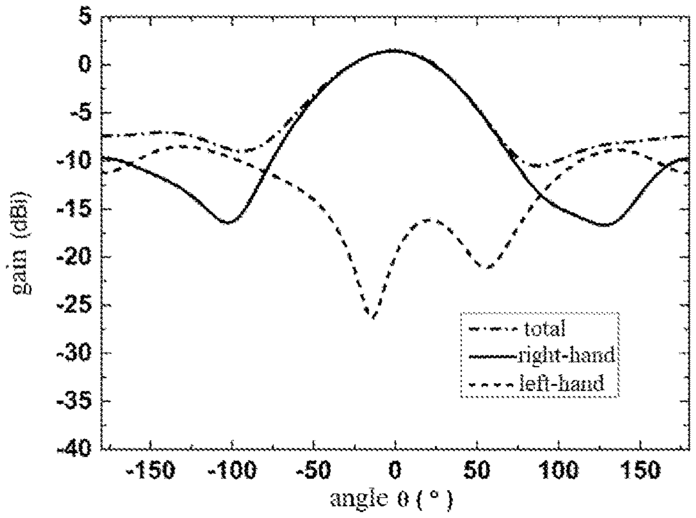
FIG. 13 is a graph illustrating a gain of a circularly polarized antenna structure in a yoz plane according to an implementation of the present disclosure.

FIG. 12 is a graph illustrating a change of a gain of a radiation wave of the antenna in the xoz plane shown in FIG. 10 with an angle θ under the condition that the watch according to this example is in the state of being worn, and FIG. 13 is a graph illustrating a change of a gain of a radiation wave of the antenna in the yoz plane shown in FIG. 11 with an angle θ. As can be seen from FIG. 12 and FIG. 13, regardless of the xoz plane or the yoz plane, the gain of the right-hand polarized wave and the total gain of the antenna are both in good consistency when 0 is within the range of 60°, which further proves that the right-hand circularly polarized antenna in this example has a good antenna performance in space and can meet the requirements for fast star search and accurate navigation.

The structure and principle of the circularly polarized antenna structure according to the implementations of the present disclosure have been described in detail above, and there may be other alternative implementations of the present disclosure suitable for implementation based on the above implementations.

In some alternative implementations, the radiator of the smart watch described above is not limited to being implemented by the metal bezel, but may be implemented by the metal frame or other part of the case such as a metal middle frame. For example, in the implementation shown in FIG. 14, the radiator 200 is provided as a part of the middle frame of the watch, such that the radiator 200 and the frame 310 together form a middle frame structure of the watch. Other structures and assembly of the watch in this implementation have been described in the foregoing and will not be repeated. The radiator 200 in this implementation is disposed at a position where the middle frame is located, which can effectively increase the volume of the radiator, and in turn greatly enhance the radiation efficiency of the antenna. However, it may be understood by those skilled in the art that the radiator 200 may be implemented in any other structure forms suitable for implementation. For example, the frame 310 in FIG. 14 may also constitute the radiator 200, so as to form a metal middle frame structure of the watch with only the radiator 200, as shown in FIG. 15. Other similar structures that constitute the radiator will not be repeated in the present disclosure.

In other implementations, the antenna structure according to the present disclosure is not limited to being applicable to the smart watch, but may be applicable to any other wearable devices suitable for implementation, such as smart bracelets or smart earphones, which is not limited in the present disclosure. Meanwhile, it may be understood that when the antenna structure is applied to other forms of wearable devices, the radiator may be implemented by other structures accordingly. Also, an annular structure of the radiator may not be limited to a circular ring, but may be implemented by any other form of ring. For example, in some examples, the annular structure of the radiator may have one of shapes including an elliptical ring, a rectangular ring, a rounded rectangular ring, a diamond ring, a triangular ring, or other polygonal ring, which is not limited in the present disclosure.

In yet other alternative implementations, the antenna structure according to the present disclosure is not limited to implementing a satellite positioning antenna, but may implement any other type of antenna suitable for implementation, such as a Bluetooth antenna, a WiFi antenna, or a 4G/5G antenna. The antenna structure according to the present disclosure may be used to implement any type of circularly polarized antenna where the size and space of the device allow, which is not limited in the present disclosure.

As can be seen from the above, with the circularly polarized antenna structure according to the implementations of the present disclosure, a circularly polarized antenna may be implemented in a wearable device, thereby improving the antenna reception efficiency and antenna performance of the wearable device and improving the positioning accuracy. Moreover, the structure for realizing the circularly polarized antenna is simple without coupling other structures, which greatly simplifies the structure and cost of the circularly polarized antenna, making it easier to be implemented in a wearable device with a smaller volume. Furthermore, the antenna structure according to the implementations of the present disclosure has a better circular polarization performance, which can further improve the positioning accuracy.

In a second aspect, an implementation of the present disclosure provides a wearable device, including the circularly polarized antenna structure according to any one of the above implementations, such that a circularly polarized antenna may be implemented in the wearable device to improve the antenna performance of the wearable device.

The wearable device may include any wearable device suitable for implementation, such as a smart watch, a smart bracelet, smart earphones, or smart glasses, which is not limited in the present disclosure.

Figure 14:
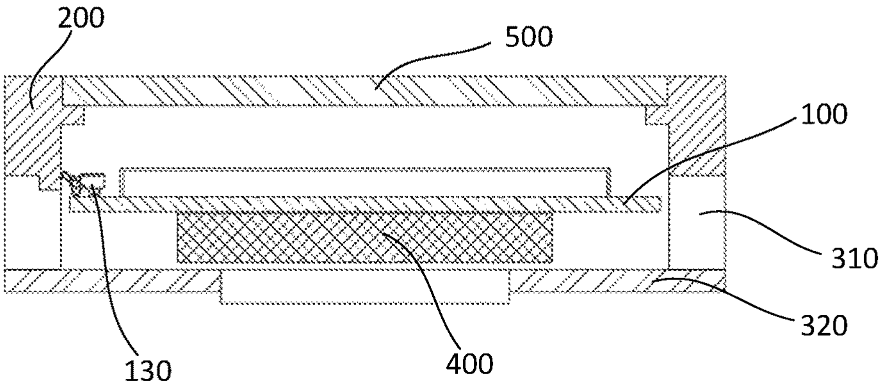
FIG. 14 is a cross-sectional view of a smart watch according to another implementation of the present disclosure.
Figure 15:
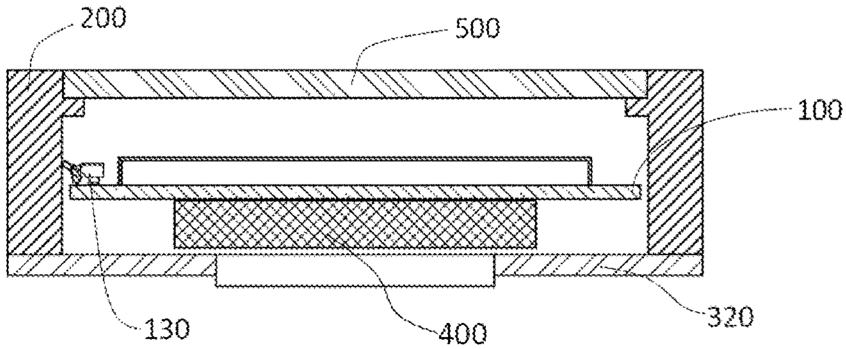
FIG. 15 is a cross-sectional view of a smart watch according to yet another implementation of the present disclosure.

In an example, the wearable device is a smart watch, and the structure of the smart watch may be implemented with reference to the above implementations in FIG. 2, FIG. 14, and FIG. 15, which will not be repeated in the present disclosure. The smart watch includes the circularly polarized antenna structure according to any one of the above implementations as a satellite positioning antenna. In an example, the smart watch includes a GPS satellite positioning antenna, which is implemented by the circularly polarized antenna structure in the above implementations. However, any other type of antenna suitable for implementation may be implemented, which will not be repeated in the present disclosure.

As can be seen from the above, the wearable device according to the implementations of the present disclosure includes the circularly polarized antenna structure, such that a circularly polarized antenna may be implemented in the wearable device to improve the antenna reception efficiency and antenna performance of the wearable device and improve the positioning accuracy. Moreover, the structure for realizing the circularly polarized antenna is simple without coupling other structures, which greatly simplifies the structure and cost of the circularly polarized antenna, making it easier to be implemented in a wearable device with a smaller volume. Furthermore, the wearable device according to the implementations of the present disclosure has a better circularly polarized antenna performance, which can further improve the positioning accuracy. In addition, when the wearable device is a smart watch, the radiator may be formed by using the bezel and/or frame of the smart watch. On the one hand, the bezel and/or frame can be used as a decorative structure for the watch to improve the aesthetics of the device; on the other hand, using the bezel and/or frame as the radiator can reduce the occupation of the internal space of the watch by the antenna structure and effectively increase the volume of the radiator, thereby greatly enhancing the radiation performance of the antenna.

It is apparent that the above implementations are merely examples for clarity of illustration, and are not limitations on the implementations. For those ordinary skilled in the art, other variations or modifications in different forms may be made based on the above description. It is not necessary or possible to exhaust all implementations herein. However, obvious variations or modifications derived therefrom still fall within the protection scope of the present disclosure.

What is claimed is:

1. An antenna structure, applicable to a wearable device, the antenna structure being circularly polarized and comprising:

a mainboard;

an annular radiator having an effective perimeter equal to a wavelength corresponding to a central operating frequency of the antenna structure;

a feeding terminal electrically connected to the radiator at a first end and connected to a feeding module of the mainboard at a second end; and a grounding terminal electrically connected to the radiator at a first end and electrically connected to a grounding module of the mainboard through a first capacitor at a second end, wherein a current in the annular radiator is pulled by the first capacitor, such that the annular radiator produces an effective circulating current being rotated, thereby realizing a circularly polarized antenna structure.

2. The antenna structure according to claim 1, wherein a first included angle β is formed along a first direction from a first connecting line connected between the feeding terminal and a center point of the radiator, to a second connecting line connected between the grounding terminal and the center point of the radiator;

the first direction is a counterclockwise direction around the radiator; and $$\beta \in \left(0, \frac{\pi}{2}\right) \cup \left(\pi, \frac{3\pi}{2}\right).$$

3. The antenna structure according to claim 2, wherein the first included angle β is an angle between 10° to 80°.

4. The antenna structure according to claim 1, wherein a first included angle β is formed along a first direction from a first connecting line connected between the feeding terminal and a center point of the radiator, to a second connecting line connected between the grounding terminal and the center point of the radiator;

the first direction is a counterclockwise direction around the radiator; and $$\beta \in \left(\frac{\pi}{2}, \pi\right) \cup \left(\frac{3\pi}{2}, 2\pi\right).$$

5. The antenna structure according to claim 1, wherein the radiator has an unbroken annular structure.

6. The antenna structure according to claim 1, wherein the antenna structure comprises one of:

a satellite positioning antenna, a Bluetooth antenna, a WiFi antenna, or a 4G/5G antenna.

7. The antenna structure according to claim 1, wherein the first capacitor has a capacitance value of 0.2 pF to 1.5 pF.

8. The antenna structure according to claim 1, wherein the antenna structure is a right-hand circularly polarized antenna.

9. The antenna structure according to claim 1, wherein a gap is formed between the radiator and the mainboard.

10. The antenna structure according to claim 1, wherein a circulating current is produced in the radiator such that the antenna structure is in circular polarization.

11. The antenna structure according to claim 1, wherein the first capacitor is configured to pull a generated current rotating in a single direction inside the radiator.

12. A wearable device, comprising the antenna structure according to claim 1.

13. The wearable device according to claim 12, wherein the wearable device comprises a smart watch, the smart watch comprising:

a case in which the mainboard is disposed; and a metal bezel surrounding an edge of an open end of the case and forming the radiator.

14. The wearable device according to claim 13, wherein the smart watch further comprises a screen assembly assembled to the open end of the case through the metal bezel.

15. The wearable device according to claim 12, wherein the wearable device comprises a smart watch, the smart watch comprising a case in which the mainboard is disposed, wherein the case comprises a metal middle frame, and at least part of the metal middle frame forms the radiator.

16. The wearable device according to claim 12, wherein the radiator has an unbroken annular structure.

17. The antenna structure according to claim 1, wherein the feeding terminal and the grounding terminal are integrally formed with the radiator and connected to the mainboard through elastic members.

18. The antenna structure according to claim 1, wherein a physical perimeter of the radiator is less than the wavelength corresponding to the central operating frequency of the antenna structure.

19. The antenna structure according to claim 1, wherein the feeding terminal is connected to the radiator directly at the first end and connected to the feeding module of the mainboard directly at the second end.

* * * * *